US008406348B2

(12) United States Patent
Fuller et al.

(10) Patent No.: US 8,406,348 B2
(45) Date of Patent: Mar. 26, 2013

(54) CORDIC BASED COMPLEX TUNER WITH EXACT FREQUENCY RESOLUTION

(75) Inventors: Arthur Thomas Gerald Fuller, Carp (CA); Bradley John Morris, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/550,975

(22) Filed: Jul. 17, 2012

(65) Prior Publication Data

US 2012/0281793 A1    Nov. 8, 2012

Related U.S. Application Data

(63) Continuation of application No. 12/214,856, filed on Jun. 23, 2008, now Pat. No. 8,243,857.

(51) Int. Cl.
*H04L 27/06* (2006.01)
(52) U.S. Cl. .................................................. 375/340
(58) Field of Classification Search .............. 375/340, 375/329, 222, 247
See application file for complete search history.

(56) References Cited

U.S. PATENT DOCUMENTS

| | | | | |
|---|---|---|---|---|
| 5,307,020 | A * | 4/1994 | Marcuard | 327/7 |
| 6,621,426 | B1 * | 9/2003 | van Nguyen | 341/50 |
| 7,720,160 | B1 * | 5/2010 | Gorecki et al. | 375/247 |
| 2002/0057733 | A1 * | 5/2002 | Sullivan | 375/222 |
| 2003/0062929 | A1 * | 4/2003 | Langlois et al. | 327/100 |
| 2004/0114701 | A1 * | 6/2004 | Markman | 375/371 |
| 2006/0026661 | A1 * | 2/2006 | McMullin et al. | 725/127 |
| 2006/0097814 | A1 * | 5/2006 | Schlesinger et al. | 332/103 |
| 2006/0125960 | A1 * | 6/2006 | Huang et al. | 348/572 |
| 2006/0233284 | A1 * | 10/2006 | Sullivan | 375/329 |

OTHER PUBLICATIONS

Chuen-Yau Chen, et al., "An Architecture for CORDIC Algorithm Realization without ROM Lookup Tables," Proceedings of the 2003 International Symposium on Circuits and Systems, 2003, 4 pages.
Eugene Grayver, et al., "Direct Digital Frequency Synthesis Using a Modified CORDIC," Proceedings of the 1998 International Symposium on Circuits and Systems, 1998, pp. V-241-V-244.
Albert Chen, et al., "Reduced Complexity Cordic Demodulator Implementation for D-AMPS and Digital IF-Sampled Receiver," the Bridge to Global Integration, Global Telecommunications Conference, vol. 3 1998, pp. 1491-1496.
A. Chen, et al., "Modified Cordic Demodulator Implementation for Digital IF-Sampled Receiver," Global Telecommunications Conference, vol. 2, 1995, pp. 1450-1454.
Helmut Knaust, "How Do Calculators Calculate?" Department of Mathematical Sciences, University of Texas at El Paso, Sep. 17, 1997, 6 pages.
Pitts Jarvis, "Implementing Cordic Algorithms," Dr. Dobb's Journal, Oct. 1990, pp. 152-158.

* cited by examiner

*Primary Examiner* — Jaison Joseph
(74) *Attorney, Agent, or Firm* — Meyertons, Hood, Kivlin, Kowert & Goetzel, P.C.

(57) ABSTRACT

Systems and methods are disclosed that include selecting a sampling frequency and a tuning resolution frequency. These systems and methods may further include determining a wordlength of the phase accumulator, a numeric representation of the phase range, and a reduced representable value of a phase accumulator. In addition, these systems and methods may include operating the phase accumulator, where the phase accumulator creates an output phase accumulator signal. These systems and methods may further includes adjusting the angle of the output phase accumulator signal, where the output phase accumulator signal is adjusted based upon the operation of the phase accumulator, where adjusting the angle of the output phase accumulator signal creates an adjusted output phase accumulator signal and operating a CORDIC module, and where the CORDIC module performs operations upon the output phase accumulator signal based upon the parameters of the phase accumulator.

20 Claims, 6 Drawing Sheets

CORDIC BASED COMPLEX TUNER WITH EXACT FREQUENCY RESOLUTION

CROSS REFERENCE TO RELATED APPLICATIONS

Priority Claim

This application is a continuation application of U.S. patent application Ser. No. 12/214,856 titled "CORDIC Based Complex Tuner with Exact Frequency Resolution", filed on Jun. 23, 2008 now U.S. Pat. No. 8,243,857 which is hereby incorporated by reference in its entirety as though fully and completely set forth herein.

TECHNICAL FIELD

The present invention relates generally to digital communication systems, and more particularly to digital tuning in wireless systems.

BACKGROUND

CORDIC (for COordinate Rotation DIgital Computer) is a simple and efficient algorithm to calculate hyperbolic and trigonometric functions. It is commonly used when no hardware multiplier is available or desirable (e.g., simple microcontrollers and FPGAs).

Due to the efficiency of its hardware realization, the CORDIC algorithm is used in digital hardware. One such application is digital tuning in wireless systems. In the past, CORDIC based tuners were limited by the fact that their frequency tuning resolution was a direct function of the tuner's effective sample rate and the phase accumulator size (i.e., Fs divided by a power 2).

Due to this limitation, desirable tuning steps (e.g., 1 Hz) might not be exactly realizable, leading to frequency errors in the tuned result. This frequency error can be particularly troublesome within the context of an amplifier system that makes use of a digital predistorter and a feedback loop.

SUMMARY

In accordance with one embodiment, a method is disclosed that includes selecting a sampling frequency and a tuning resolution frequency. This method further includes determining a wordlength of the phase accumulator, a numeric representation of the phase range, and a reduced representable value of a phase accumulator. In addition, this method may include operating the phase accumulator, where the phase accumulator creates an output phase accumulator signal. This method also includes adjusting the angle of the output phase accumulator signal, wherein the output phase accumulator signal is adjusted based upon the operation of the phase accumulator, and wherein adjusting the angle of the output phase accumulator signal creates an adjusted output phase accumulator signal and operating a CORDIC module, and wherein the CORDIC module performs operations upon the output phase accumulator signal based upon the parameters of the phase accumulator.

In accordance with another embodiment a system is disclosed that uses a phase accumulator that accepts a phase signal input. This phase accumulator outputs a phase accumulator signal that allows for the system to perform substantially exact frequency tuning. In addition, this system includes an adjust angle module that accepts the phase accumulator signal and an in-phase (I) signal and quadrature (Q) signal. This adjust angle module generates an angle adjusted I signal, an angle adjusted Q signal, and an angle adjusted phase signal. Finally, the system includes a CORDIC module that includes at least one CORDIC stage and accepts the angle adjusted I signal, the angle adjusted Q signal, and the angle adjusted phase signal and creates a final I signal and a final Q signal.

In yet another embodiment a method for operating a phase accumulator is disclosed which includes adding a phase and a feedback input to create an added signal, delaying the added signal to create a delayed signal, analyzing the delayed signal to determine if the signal is within an acceptable range, and if the signal not within an acceptable range correcting the signal to be within the acceptable range. This method further includes outputting the delayed signal that is within the acceptable range.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
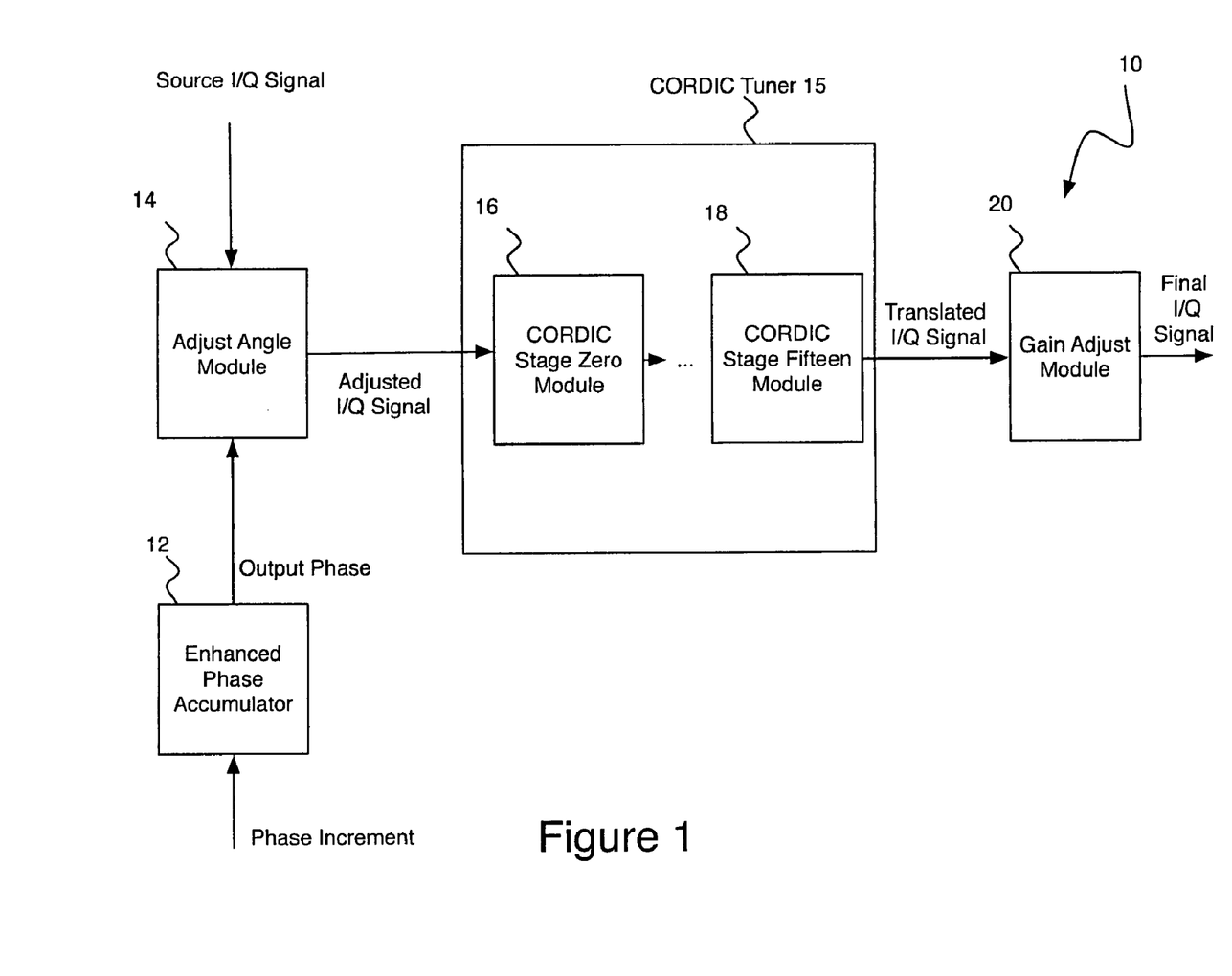
FIG. 1 depicts a high level diagram of an example CORDIC-based complex tuner with enhanced frequency resolution system.

FIG. 1 illustrates an example CORDIC based complex tuner with enhanced frequency resolution system 10 in accordance with the present disclosure. The CORDIC-base tuner system 10 shown in FIG. 1 is for illustration purposes only, and represents one embodiment only. Other embodiments of the system may be used without departing from the scope of this disclosure. Reference to "standards" in the following text is meant to encompass existing and future versions of the referenced standards, as well as standards encompassing the principles of the subject matter disclosed and claimed herein.

In this example, the system 10 forms part of a larger communications network (not shown) transmitting signals into the system 10 and receiving signals from the system 10. Due to the efficiency of its hardware realization, the CORDIC algorithm finds many applications in digital hardware. One such application is digital tuning in wireless systems (e.g., multi-standard channelizer ASICs). In the past, CORDIC based tuners were limited by the fact that their frequency tuning resolution was a direct function of the tuner's effective sample rate and the phase accumulator size. Consequently, desirable tuning steps (e.g., 1 Hz) might not be exactly realizable, leading to frequency errors in the tuned result. This frequency error can be particularly troublesome within the context of an amplifier system that makes use of a digital predistorter (and its associated training algorithms). Disclosed are systems and methods that allow for the enhanced and substantially exact CORDIC-based tuning of system 10. System 10 allows for the precise tuning of any system to any frequency.

The embodiment of system 10 shown in FIG. 1 comprises an enhanced phase accumulator 12, an adjust angle module 14, a CORDIC tuner 15 with a CORDIC stage zero module 16 and a CORDIC stage fifteen 18, and a gain adjust module 20. The enhanced phase accumulator 12 receives a phase increment signal from another device (not shown), such as a modulator or other device outside of the system 10. It is understood that a time modulating phase increment could result in frequency shift keying. The enhanced phase accumulator 12 outputs an output phase signal to the adjust angle module 14. This output phase signal may be any value within a range defined by $Acc'_{max}$ and $-Acc'_{max}$, wherein the range incorporates either $Acc'_{max}$ or $-Acc'_{max}$.

Also in the embodiment shown in FIG. 1, an in-phase (I) and a quadrature (Q) signal are received by the adjust angle module 14 from an I/Q source (not shown) that may be outside of the system 10. These signals may be transmitted from any source including, but not limited to, any device, system, or apparatus capable of generating I and Q signals.

The adjust angle module 14 receives and adjusts the I and Q source signals and the output phase signal. These adjusted I, Q, and output phase signals are then input to the CORDIC tuner 15 for processing and generation of translated signals. CORDIC stage fifteen 18 generates and outputs final translated I and Q signals to the Gain Adjust Module 20. The Gain Adjust Module 20 adjusts the gain of the final translated I and Q signals and generates final output I and Q signals. The Gain Adjust Module 20 normalizes any gain created by the CORDIC units. The output phase signal from each CORDIC stage may be dissimilar based upon the function performed by that CORDIC stage.

In the embodiment of FIG. 1, the enhanced phase accumulator 12 is a device capable of adjusting the phase increment signal prior to input to the Adjust Angle Module 14. It is understood that adjust angle module 14 and the CORDIC stages will be programmed based upon the parameters of the enhanced phase accumulator 12. Enhanced phase accumulator 12 maps the representation of the phase range, as described more fully below.

The enhanced phase accumulator 12 maps the phase range of pi to -pi to a range of $Acc'_{max}$ to $-Acc'_{max}$. The range $Acc'_{max}$ to $-Acc'_{max}$ still represents the entire range of -pi to pi, but may be a mapping with fewer values in between -pi to pi than conventional mapping. For instance, in a normal mapping, pi may equal 1. The enhanced phase accumulator 12 may reduce pi to another number less than 1, for example 0.7. In this example, the "old" range might be 1 to -1, while the "reduced" range might be 0.7 to -0.7.

Figure 2:
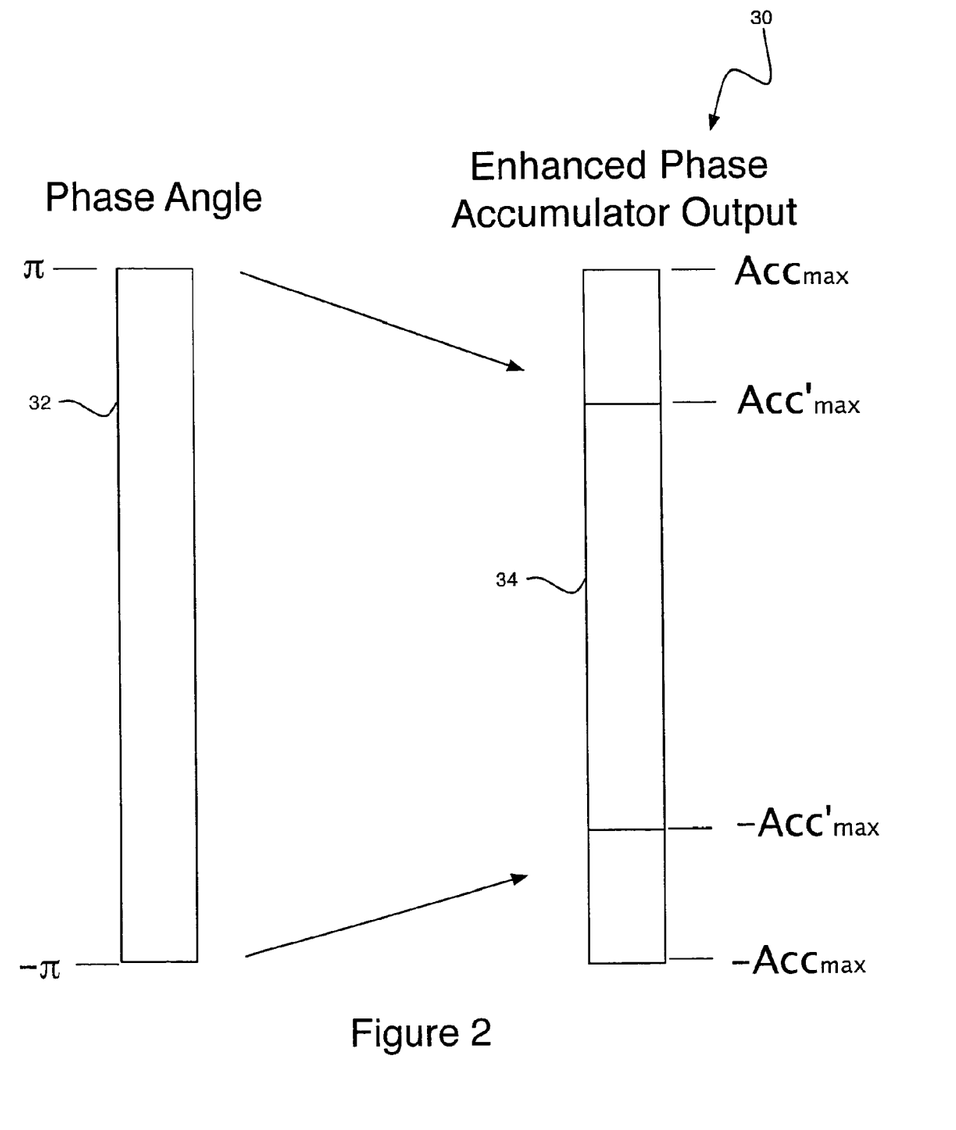
FIG. 2 illustrates the phase range of an enhanced phase accumulator.
Figure 3:
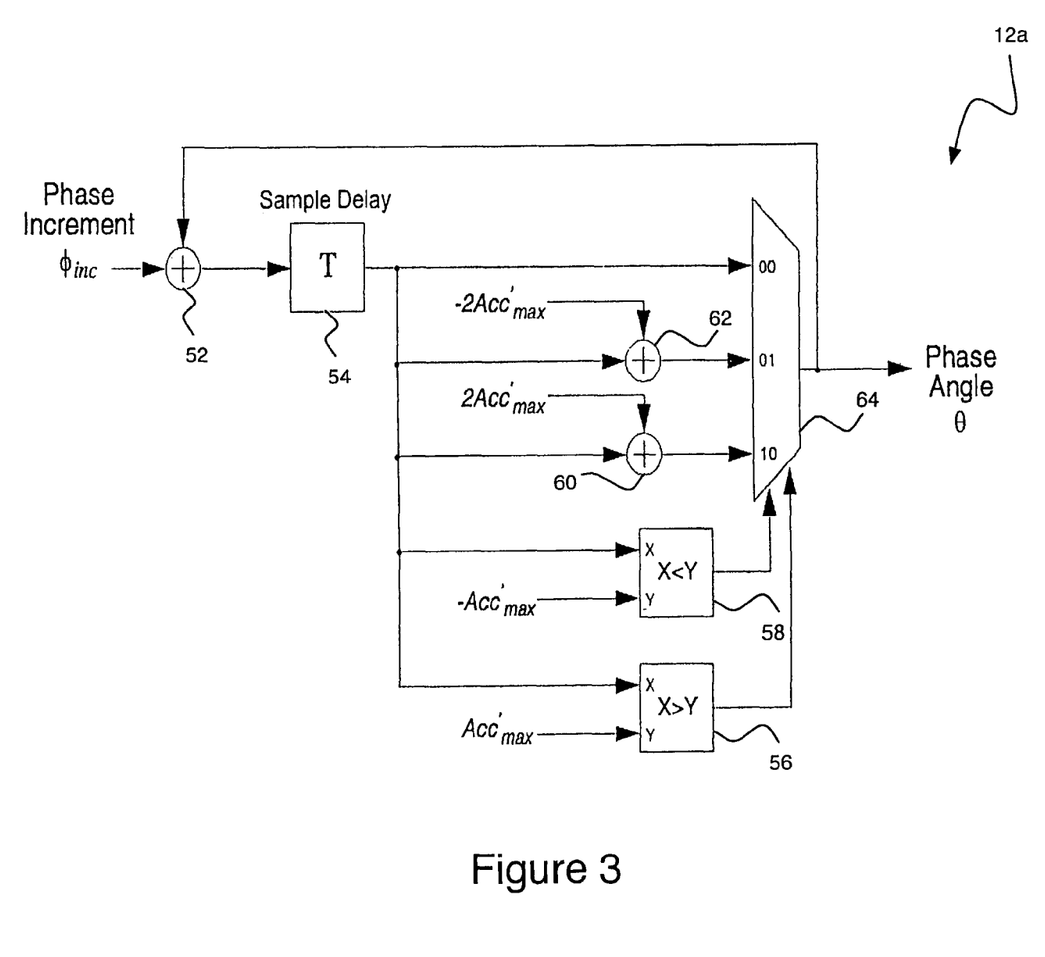
FIG. 3 is a block diagram of one embodiment of the enhanced phase accumulator shown in FIG. 1.
Figure 4:
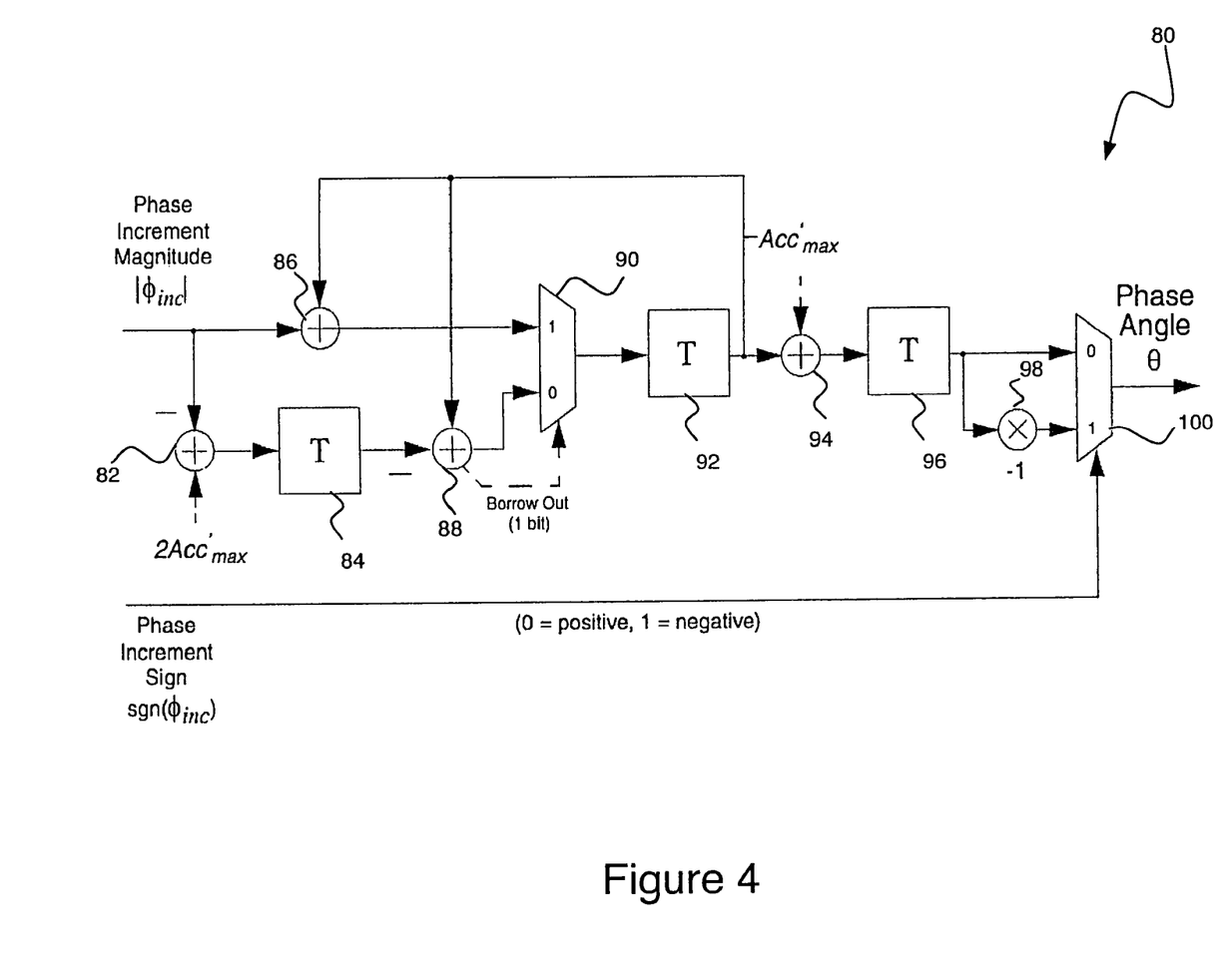
FIG. 4 is a block diagram of another embodiment of the enhanced phase accumulator shown in FIG. 1.

In most cases, there are "steps" between the max and min values that are used by a phase accumulator, and the magnitude between steps may be different. If each "step" had a 0.125 increment, the "reduced range" would not have all of the values of the "old" range (e.g., 0.8, 0.9, 1, -0.8. -0.9). An illustration of the reduced range is shown in FIG. 2, and example embodiments of the enhanced phase accumulator 12 are shown in FIGS. 3 and 4.

The CORDIC stage zero module 16 and the CORDIC stage fifteen 18 (and those stages in between) perform functions, including, but not limited to hyperbolic and exponential functions, logarithm, trigonometric, multiplication, division, and square root functions. A discussion of the applications of these functions to the present disclosure follows below. The CORDIC may have any number of stages, and the inclusion of a zero and fifteenth stage in FIG. 1 are for exemplary purposes only. It is explicitly understood that the CORDIC modules will need to be modified based upon $Acc'_{max}$ and $-Acc'_{max}$.

In the CORDIC algorithm the realizable rotation angles are fundamentally limited to an approximate range of +/−1.74 radians. Therefore, if the desired angle of rotation is outside of this range, then the input and the desired rotation angle should be adjusted such that the required angle of rotation is reduced to within the realizable range. Adjust angle module 14 is any device capable of adjusting a signal consistent with requirements of the CORDIC algorithm, and adjust angle module 14 will be adjusted to take into consideration $Acc'_{max}$ (pi) and $-Acc'_{max}$ (-pi). This can be accomplished in accordance with equations (1) and (2).

$$\left. \begin{array}{l} I'_{in} = Q_{in} \\ Q'_{in} = -I'_{in} \\ \theta'_{in} = \theta_{in} + \frac{\pi}{2} \end{array} \right\} \text{ if } \theta \leq -\frac{\pi}{2} \quad (1)$$

$$\left. \begin{array}{l} I'_{in} = Q_{in} \\ Q'_{in} = -I'_{in} \\ \theta'_{in} = \theta_{in} - \frac{\pi}{2} \end{array} \right\} \text{ if } \theta \geq -\frac{\pi}{2} \quad (2)$$

The CORDIC algorithm provides a hardware efficient coordinate rotation function by decomposing the desired rotation angle into a sum of monotonically decreasing angles, whose values are chosen such that their corresponding arctangent is a power of 2. In this way, the overall rotation can be partitioned into a number of stages, each consisting of shifts and addition/subtraction operators only.

The CORDIC algorithm has an inherent gain of approximately 1.64. Therefore, the output of the CORDIC should be adjusted accordingly by a gain of approximately 0.607. This gain compensation may be implemented or realized using a CSD multiplier (i.e., fixed shifts and additions only).

Given that frequency is the derivative of phase, the rotation angle provided to the CORDIC stages should update continuously by a specified fixed amount in order realize the desired frequency translation. This is accomplished by using a "phase accumulator." The phase accumulator may be implemented or realized as a pure integrator that updates every sample period as shown in equation (3).

$$-Acc_{max} \leq \theta < Acc_{max} \quad (3)$$

In equation (3) $Acc_{max}$ defines the maximum representable value of the accumulator. When using fractional fixed-point arithmetic, $Acc_{max}=1$. The CORDIC stages incorporate a factor of pi divided by $Acc_{max}$ in their internal processing such that one effectively obtains a phase angle variation as illustrated by equation (4).

$$-\pi \leq \theta < \pi \quad (4)$$

The adder in the phase accumulator is set to "wrap" when overflow occurs (i.e., the summation result exceeds the representable fixed-point numeric range). In this way, the phase accumulator exhibits the desired modulo behavior inherent in angle arithmetic (e.g., an angle of 420° is equivalent to an angle of 60°) in a hardware efficient manner.

The "phase increment" is a constant value that determines the amount of frequency translation ($f_{tune}$) that occurs. This is defined in accordance with equation (5).

$$f_{tune} = \frac{\theta_{inc} F_s}{2 Acc_{max}} \quad (5)$$

In equation (5) Fs is the sampling frequency of the input data stream. From equation (5), it can be seen that the step size between possible tuning frequencies, referred to as the tuning resolution ($f_{res}$), is a function of the smallest representable phase increment value ($\theta_{incmin}$). In a typical implementation, the ratio of the $\theta_{incmin}$ and $Acc_{max}$ is directly proportional to the wordlength of the accumulator (N) as shown in equation (6).

$$\frac{\theta_{inc\,min}}{Acc_{max}} = 2^{-N+1} \quad (6)$$

Using equation (5) the tuning resolution ($f_{res}$) may be determined to be consistent with equation (7).

$$f_{res} = \frac{\theta_{inc\,min} F_s}{2 Acc_{max}} \quad (7)$$

Substituting equations (6) and (7) yields equation (8).

$$f_{res} = 2^{-N} F_s \quad (8)$$

For example, if Fs=30 MHz and the accumulator has a wordlength of N=25, then $f_{res}$=0.894069671630859375 Hz. Similarly, if N=24, then $f_{res}$=1.78813934326171875 Hz. Fs will be a specified design parameter and will typically not be a power of 2. In this way, the achievable tuning resolution will not necessarily be the desired value. Consequently, an exact desired tuning resolution (e.g., to be an integer) may not be possible within the context of the typical CORDIC based tuner. For instance, if a tuning resolution of exactly 1 Hz was desired with Fs=30 MHz, this would not be possible. The nearest achievable tuning resolutions for a typical CORDIC based tuner would be 0.894069671630859375 Hz or 1.78813934326171875 Hz.

In order to overcome this tuning frequency resolution limitation, $f_{res}$ should become a design parameter. In order to accomplish this, the full range of the phase accumulator $Acc_{max}$ can be restricted to a smaller range of values bounded by $Acc'_{max}$. The value of $Acc'_{max}$ for a desired $f_{res}$ can be obtained from equation (7), by solving for $Acc_{max}$ and replacing it with $Acc'_{max}$ in accordance with equation (9).

$$Acc'_{max} = \frac{\theta_{inc\,min} F_s}{2 f_{res}} \quad (9)$$

Note that the choice of N, which affects $\theta_{incmin}$ and/or $Acc_{max}$ depending on numeric representation, should be chosen such that $Acc_{max} > Acc'_{max}$. Also, this approach requires that $Acc'_{max}$ is representable in the word length and numerical format defined in the accumulator. In this way, the mapping of the phase accumulator output has been modified as illustrated in FIG. 2.

FIG. 2 shows the output of the enhanced phase accumulator 12. The total range of phase angles may have a first range of values 32 (e.g. 1, −1) that is used to represent pi to −pi. The output of the enhanced phase accumulator 12 also represents a range of −pi to pi, but may comprise a second range of values 34 (e.g. 0.7, −0.7). As illustrated by FIG. 2, the endpoints of a first range of values 32 has been mapped to the endpoints of a second range of values 34. $Acc_{max}$ represents the maximum value of the total range of phase angles while $Acc'_{max}$ represents the maximum value of the enhanced phase accumulator 12 output. The minimum value of the total range of phase angles is represented by $-Acc_{max}$ while the minimum value of the enhanced phase accumulator 12 output is represented by $-Acc'_{max}$.

FIG. 3 is an example of one implementation (identified using reference numeral 12a) for the enhanced phase accumulator 12. In this first embodiment, the phase increment signal is input to a first signal adder 52. The phase increment signal can be positive or negative when received by the accumulator 12a.

First signal adder 52 adds the phase output signal with the phase increment signal to generate a first added signal for input to a sample delay 54. The delay 54 outputs a first delayed signal for input to a multiplexer 64, a second adder 60, a third adder 62, a first comparator 56, and a second comparator 58.

In one example, the phase increment signal when added to the phase output signal (output from multiplexer 64) has a phase that is less than $Acc'_{max}$ and greater than $-Acc'_{max}$. In this example, the signal output from delay 54 will be output from the accumulator 12a. In this example, the first comparator 56 outputs zero (the signal from the sample delay 54 is smaller than $Acc'_{max}$) and the second comparator 58 outputs zero (the signal from sample delay 54 is larger than $-Acc'_{max}$). The input select (00) instructs the multiplexer 64 to select the signal output from the delay 54.

In a second example, the phase increment signal when added to the phase output signal (output from the multiplexer 64) has a phase that is greater than $Acc'_{max}$. In this example, the signal output from the delay 54 is added with $-2Acc'_{max}$ in the third adder 62, and the multiplexer 64 will transmit the signal from the third adder 62. Multiplexer 64 outputs this signal because the first comparator 56 registers one (the signal from sample delay 54 is larger than $Acc'_{max}$) and the second comparator 58 registers zero (the signal from sample delay 54 is larger than $-Acc'_{max}$). This results in an input select (01) to the multiplexer 64, and the multiplexer 64 therefore selects the signal from the third adder 62.

In a third example, the phase increment signal when added to the phase output signal (output from the multiplexer) 64 has a phase that is less than $Acc'_{max}$ and less than $-Acc'_{max}$. In this example, the signal output from delay 54 is added with $2Acc'_{max}$ in the second adder 60, and the multiplexer 64 will transmit the signal from the second adder 60. This is a result of the first comparator 56 registering zero (the signal from sample delay 54 is smaller than $Acc'_{max}$) and the second comparator 58 registering one (the signal from sample delay 54 is less than $-Acc'_{max}$). This results in an input select (10) to the multiplexer 64, and the multiplexer therefore selects the signal from the second adder 60.

As can be seen in FIG. 3, the critical path of the accumulator 12 comprises two adders and the 3-input multiplexer 64. This effectively limits the maximum operating rate of the phase accumulator 12, and therefore the CORDIC stages.

FIG. 4 is another implementation (identified using reference numeral 80) of the enhanced phase accumulator 12. In this embodiment, the phase accumulator 80 always increments in the same direction, allowing for a more hardware efficient realization.

In the accumulator 80, the initial phase increment signal magnitude is input to a first adder 82 and a second adder 86. The phase increment signal input to the first adder 82 is first made negative (not shown) and added to $2Acc'_{max}$. The output of the first adder 82 is input to a first delay 84 to generate a first delayed signal.

A third adder 88 combines the output from the first delay 84 with a second delayed signal from a second delay 92 to generate a second added signal. The second added signal is input to a first multiplexer 90. The third adder 88 controls the first multiplexer 90 through a borrow out bit indicating if the first multiplexer 90 should propagate the second added signal or a third added signal created by the second adder 86. In the event the borrow out bit from the third adder 88 is zero, the first multiplexer 90 propagates the second added signal. In the event the borrow out bit from the third adder is one, the first multiplexer 90 will propagate the signal from the second adder 86.

The output of the first multiplexer 90 is input to the second delay 92 to generate the second delay signal. The second delay signal is fed back to the second adder 86, the third adder 88, and input to a fourth adder 94. The fourth adder 94 combines the second delay signal and with $-Acc'_{max}$ to create a fourth added signal. The fourth added signal is input to a third delay 96 that generates a third delay signal. The third delay signal is input to a multiplier 98 and a second multiplexer 100. The multiplier 98 multiplies the fourth added signal by negative one. If the initial phase increment sign was positive, the second multiplexer 100 transmits the signal output from the third delay 96. If the initial phase increment sign was negative, the second multiplexer 100 will transmit the signal from the multiplier 98.

It is understood that relative to the embodiment shown in FIG. 3, the accumulator architecture embodiment in FIG. 4 decreases the critical path.

Figure 5:
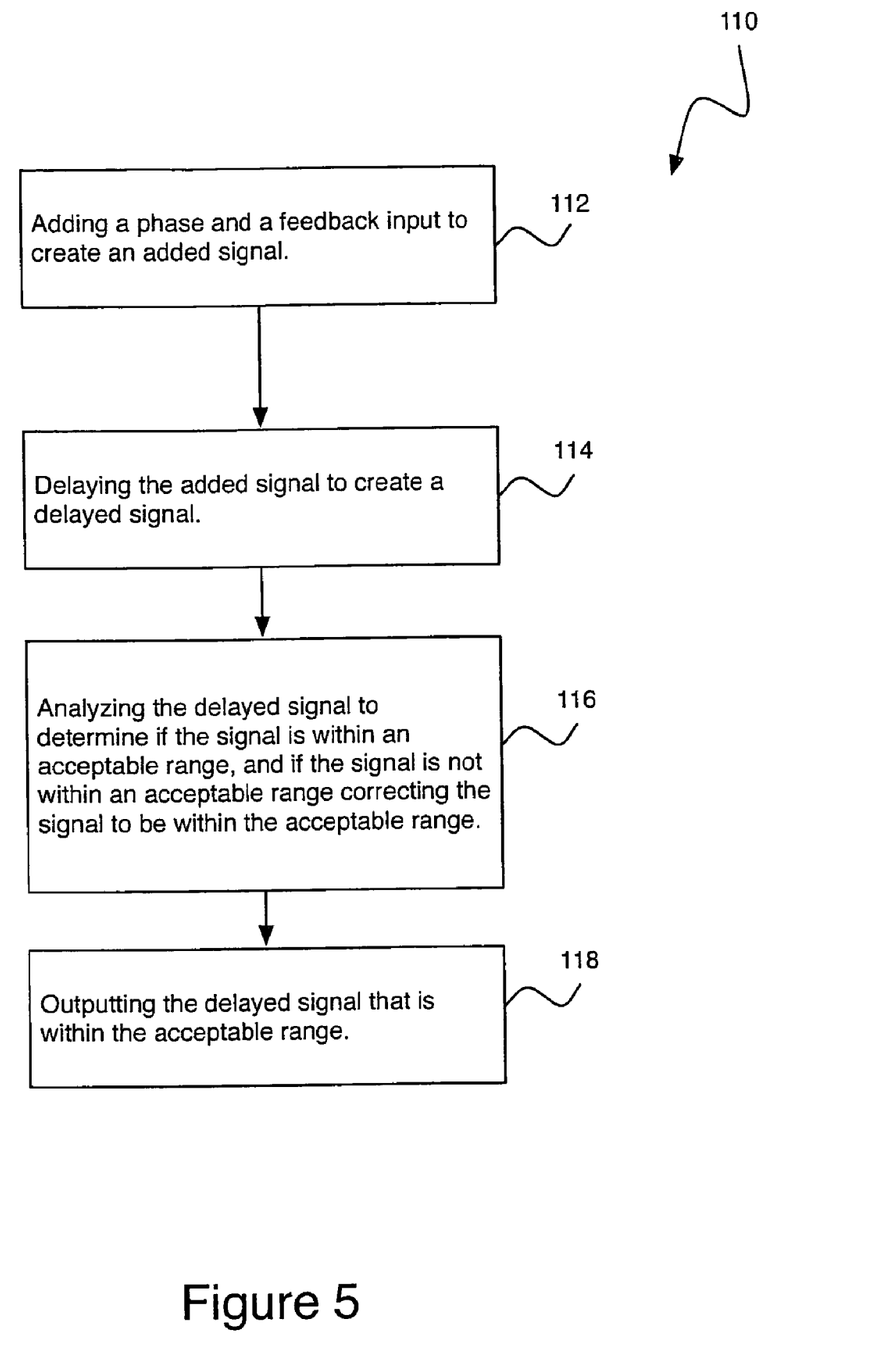
FIG. 5 is a flowchart of one method of operating a phase accumulator.

FIG. 5 illustrates a process 110 of operating the phase accumulator 12a using the embodiment illustrated in FIG. 3. In block 112, the method begins by adding a phase and a feedback input to create an added signal. In block 114, the phase accumulator 12a delays the added signal to create a delayed signal. In block 116, the phase accumulator analyzes the delayed signal to determine if the signal is within an acceptable range, and if the signal is not within an acceptable range correcting the signal to be within the acceptable range. In block 118, the phase accumulator outputs the delayed signal that is within the acceptable range.

In order to determine the N value for the phase accumulator 12, parameters for the phase accumulator 12 may be chosen. The parameters of the new phase accumulator are, in one specific example, selected to be a sampling frequency of Fs=30 MHz, a desired tuning resolution of 1 Hz, and a phase accumulator based on a fractional arithmetic of 1. Therefore equation (10) may be determined.

$$\theta_{incmin} = 2^{-N+1} \quad (10)$$

Using equation 10, it is possible to determine N using the sampling frequency, the desired tuning resolution frequency and the $Acc_{max}$ of the enhanced phase accumulator. Substituting the selected values into equation (9) while not violating the $Acc_{max} > Acc'_{max}$ constraint allows an N to be chosen that satisfies equations (11) and (12).

$$Acc'_{max} = \frac{2^{-N+1} F_s}{2} \quad (11)$$

$$1 > Acc'_{max} \quad (12)$$

The minimum value of N that satisfies both equations is N=25, which corresponds to $Acc'_{max}$=0.894069671630859375 (exactly representable in the selected wordlength). These parameters may be programmed into the enhanced phase accumulator 12. The CORDIC modules 16, 18 and the angle adjust module 14 may be programmed to take into consideration these parameters, and the complex turner with enhanced frequency resolution system is operated according to the N value determined in block 114.

Figure 6:
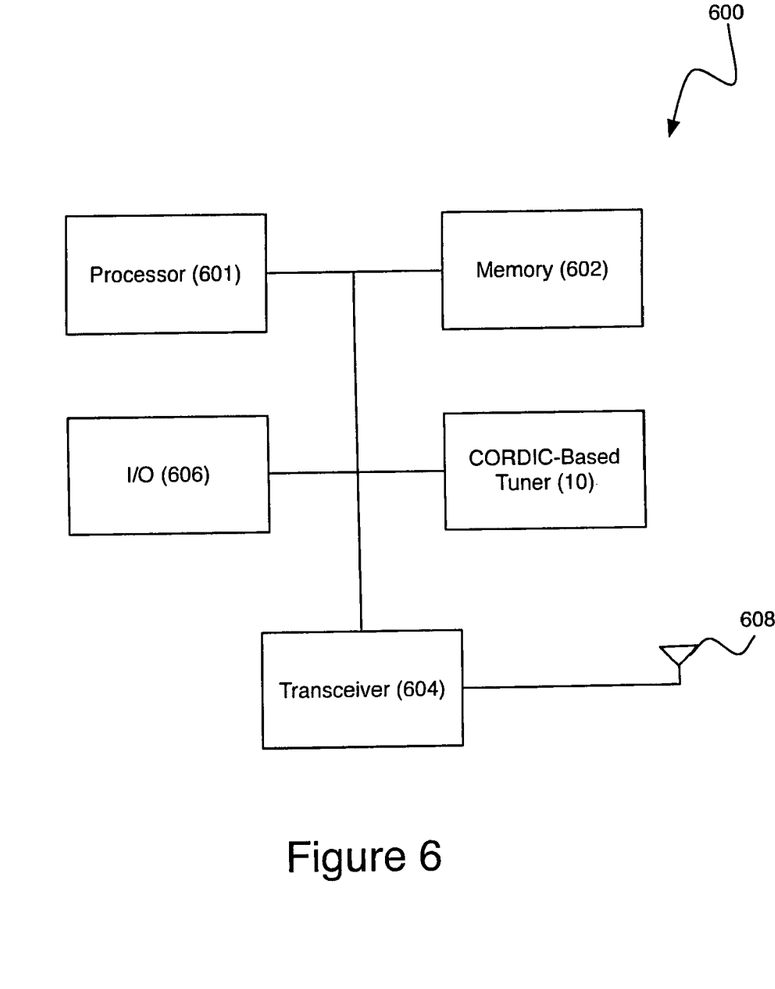
FIG. 6 illustrates an example communications device incorporating a CORDIC-based complex tuner in accordance with the present disclosure.

Now turning to FIG. 6, there is shown a block diagram of a communications device 600 incorporating the method(s) and/ or CORDIC-based complex tuner 10 in accordance with the present disclosure. The device 600 may be any communications device, including a base station, mobile wireless device and the like. The device 600 includes a processor (which may include a digital signal processor) 601, a memory 602, a transceiver 604, input/output devices 606, and an antenna 608. Other components may be included, but not shown. Details of the operation and structure of these components, except as necessary to illustrate the operations and methods described herein, have been omitted. The device 600 includes the CORDIC-based tuner 10. Though shown as a separate component, the CORDIC-based tuner 10 may be implemented in hardware, software or combination thereof (including firmware).

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   specifying a sampling frequency, a tuning resolution frequency, and a desired range for an accumulator, wherein a boundary value of the desired range is representable in a wordlength and numerical format defined in the accumulator;
   determining a wordlength of the accumulator according to at least the specified sampling frequency and the tuning resolution frequency;
   receiving in the accumulator an increment signal;
   generating in the accumulator a scaled output signal based on the increment signal according to the desired range;
   receiving source signals; and
   generating adjusted source signals and an adjusted scaled output signal by adjusting the received source signals and the scaled output signal.

2. The method of claim 1, further comprising:
   providing the adjusted source signals and the adjusted scaled output signal to a tuner.

3. The method of claim 2, further comprising:
   receiving in the tuner the adjusted source signals and the adjusted scaled output signal; and
   generating and outputting translated source signals by performing translation operations in the tuner one the adjusted source signals according to the adjusted scaled output signal.

4. The method of claim 3, wherein the tuner is a CORDIC (Coordinate Rotation Digital Computer) module, and the source signals comprise I/O signals.

5. The method of claim 4, wherein the I/O signals comprise an in-phase (I) signal and a quadrature (Q) signal.

6. The method of claim 1, wherein the tuning resolution frequency is a whole number.

7. The method of claim 1, wherein the accumulator is a phase accumulator, wherein the desired range is a desired phase range, wherein the increment signal is a phase increment signal, and wherein the output signal is a phase signal.

8. A device, comprising:
- a phase accumulator configured to:
  - receive a phase increment value; and
  - generate and output an adjusted phase value based on the received phase increment value, wherein the adjusted phase value enables frequency tuning at a programmable desired tuning frequency resolution;
- an angle-adjustment module configured to:
  - receive the adjusted phase value and a pair of input signals; and
  - generate and output a pair of angle-adjusted of input signals and an angle-adjusted phase value; and
- a tuning module, wherein the tuning module comprises at least one tuning stage, and is configured to:
  - receive the angle-adjusted pair of input signals and the angle-adjusted phase value; and
  - generate a pair of translated output signals based on the received pair of angle-adjusted input signals and the received angle-adjusted phase value.

9. The device of claim 8, further comprising:
- a gain-adjust module configured to:
  - receive the pair of translated output signals; and
  - output a pair of gain-adjusted output signals by adjusting a gain of the received pair of translated output signals.

10. The device of claim 8, wherein the tuner module comprises a plurality of tuning stages that comprise the at least one tuning stage.

11. The device of claim 8, wherein the phase accumulator is configured to:
- accept positive and negative phases;
- disregard a sign of an accepted phase of the positive and negative phases for at least part of an operation of the phase accumulator; and
- correct a sign of the adjusted phase value.

12. The device of claim 8, wherein the phase accumulator is configured to receive the phase increment value from a modulator.

13. The device of claim 8, wherein the pair of input signals comprise an in-phase signal (I) and a quadrature (Q) signal.

14. The device of claim 9, further comprising a filter configured to filter the gain adjusted I signal and the gain adjusted Q signal.

15. A method for signal tuning, the method comprising:
- receiving a first phase increment value comprised within a first numeric range;
- mapping the first phase increment value to a second phase increment value comprised in a second numeric range corresponding to the first numeric range;
- outputting a phase output value according to the second phase increment value;
- receiving a pair of input signals;
- generating a pair of adjusted input signals by angle-adjusting the received pair of input signals;
- generating an adjusted phase output value by angle-adjusting the phase output value; and
- tuning the pair of adjusted input signals according to the adjusted phase output value, with a tuner that was programmed based on the second numeric range.

16. The method of claim 15, wherein the tuner is a CORDIC (Coordinate Rotation Digital Computer) based tuner.

17. The method of claim 16, wherein the pair of input signals comprise an in-phase (I) signal and a quadrature (Q) signal.

18. The method of claim 15, wherein CORDIC based tuner comprises a plurality of CORDIC stages.

19. The method of claim 15, further comprising filtering the pair of tuned adjusted input signals.

20. The method of claim 19, further comprising transmitting the pair of filtered tuned adjusted input signals.

* * * * *